(12) United States Patent
Mizusaki et al.

(10) Patent No.: US 10,126,601 B2
(45) Date of Patent: Nov. 13, 2018

(54) LIQUID CRYSTAL DISPLAY DEVICE AND METHOD FOR MANUFACTURING LIQUID CRYSTAL DISPLAY DEVICE

(71) Applicants: Sharp Kabushiki Kaisha, Osaka-shi, Osaka (JP); Toyo Gosei Co., Ltd., Ichikawa-shi, Chiba (JP)

(72) Inventors: Masanobu Mizusaki, Osaka (JP); Satoshi Enomoto, Inzai (JP)

(73) Assignees: SHARP KABUSHIKI KAISHA, Sakai (JP); TOYO GOSEI CO., LTD., Chiba (JP)

( * ) Notice: Subject to any disclaimer, the term of this patent is extended or adjusted under 35 U.S.C. 154(b) by 715 days.

(21) Appl. No.: 14/396,884

(22) PCT Filed: Apr. 24, 2013

(86) PCT No.: PCT/JP2013/062034
§ 371 (c)(1),
(2) Date: Oct. 24, 2014

(87) PCT Pub. No.: WO2013/161865
PCT Pub. Date: Oct. 31, 2013

(65) Prior Publication Data
US 2015/0062518 A1    Mar. 5, 2015

(30) Foreign Application Priority Data

Apr. 27, 2012 (JP) .................. 2012-103846

(51) Int. Cl.
*G02F 1/1337* (2006.01)
*C08F 220/30* (2006.01)
(Continued)

(52) U.S. Cl.
CPC ...... *G02F 1/133788* (2013.01); *C08F 220/30* (2013.01); *C08F 222/14* (2013.01);
(Continued)

(58) Field of Classification Search
CPC .............. C09K 19/56; G02F 1/133711; G02F 1/133788; G02F 2001/133397;
(Continued)

(56) References Cited

U.S. PATENT DOCUMENTS

2005/0116200 A1   6/2005   Nakanishi et al.
2005/0264737 A1   12/2005   Kataoka et al.
(Continued)

FOREIGN PATENT DOCUMENTS

JP   09-255706 A   9/1997
JP   2005-221617 A   8/2005
(Continued)

*Primary Examiner* — Sophie Hon
(74) *Attorney, Agent, or Firm* — Keating & Bennett, LLP (57) ABSTRACT

A liquid crystal display device includes a substrate; a liquid crystal layer containing a liquid crystal material; and a first layer formed on the substrate, the first layer being configured to control the alignment of liquid crystal molecules, the first layer being placed between the substrate and the liquid crystal layer, and being formed by polymerization of two or more kinds of radical polymerizable monomers in the liquid crystal layer.

13 Claims, 1 Drawing Sheet

(51) Int. Cl.
*C08F 222/14* (2006.01)
*G02F 1/1333* (2006.01)
*C08F 222/10* (2006.01)

(52) U.S. Cl.
CPC .. *G02F 1/133711* (2013.01); *C08F 2222/102* (2013.01); *G02F 2001/133397* (2013.01); *Y10T 428/1005* (2015.01)

(58) Field of Classification Search
CPC C08F 220/30; C08F 2222/102; C08F 222/14; Y10T 428/1005
See application file for complete search history.

(56) References Cited

U.S. PATENT DOCUMENTS

| | | |
|---|---|---|
| 2006/0038936 A1 | 2/2006 | Hirosawa |
| 2008/0090026 A1 | 4/2008 | Bernatz et al. |
| 2011/0310319 A1* | 12/2011 | Mizusaki ............ G02B 5/3083 349/33 |
| 2013/0342791 A1 | 12/2013 | Mizusaki et al. |

FOREIGN PATENT DOCUMENTS

| | | | | |
|---|---|---|---|---|
| JP | 2005-338613 A | 12/2005 | | |
| JP | 2006-058755 A | 3/2006 | | |
| JP | 2008-116931 A | 5/2008 | | |
| JP | 4175826 B2 | 11/2008 | | |
| JP | 4547598 B2 * | 9/2010 | ........... | G02F 1/1333 |
| WO | 2012/121321 A1 | 9/2012 | | |

\* cited by examiner

LIQUID CRYSTAL DISPLAY DEVICE AND METHOD FOR MANUFACTURING LIQUID CRYSTAL DISPLAY DEVICE

TECHNICAL FIELD

An aspect of the present invention relates to a liquid crystal display device and a method for manufacturing a liquid crystal display device. Specifically, an aspect of the present invention relates to a liquid crystal display device including a polymer layer capable of sustaining the alignment of liquid crystals, formed by polymerizing a monomer in a liquid crystal composition, and a favorable method for manufacturing the liquid crystal display device.

BACKGROUND ART

A liquid crystal display (LCD) device is a display device that controls the transmission/shielding (On/Off of display) of light by controlling the alignment of liquid crystal molecules having birefringence. Examples of the display mode of an LCD include a twisted nematic (TN) mode in which liquid crystal molecules having a positive dielectric constant anisotropy are spirally aligned along the thickness direction of a liquid crystal layer, a vertical alignment (VA) mode in which liquid crystal molecules having a negative dielectric constant anisotropy are vertically aligned with respect to the substrate surface, an in-plane switching (IPS) mode in which liquid crystal molecules having a positive dielectric constant anisotropy are horizontally aligned with respect to the substrate surface and a horizontal electric field is applied to the liquid crystal layer, and a polymer dispersed liquid crystal (PDLC) mode in which display is performed by dispersing liquid crystal molecules in a polymer matrix to scatter external light.

LCDs, which have advantages in the thin profile, light weight, and low power consumption, are widely used as display devices such as televisions, personal computers, and PDAs. Particularly in recent years, liquid crystal display devices have been rapidly increased in size as seen in liquid crystal display devices for televisions. A multi-domain vertical alignment (MVA) mode is preferably employed in large-sized liquid crystal display devices because large-sized liquid crystal display devices with a wide viewing angle can be produced with high yield. In an MVA mode, liquid crystal molecules having a negative dielectric constant anisotropy are vertically aligned, and a bank (linear protrusion) is provided on a substrate or an opening (slit) of an electrode is provided as an alignment control structure. Alignment control structures in MVA LCDs allow control of the alignment direction of liquid crystals in plural directions under applied voltage even an alignment film is not subjected to rubbing treatment, and the viewing characteristics are better in such a MVA mode than in a conventional TN mode.

However, MVA LCDs disadvantageously provide dark displays. The main cause of this problem is that borders of alignment divisions formed by areas where linear protrusions (ribs) and/or slits generate dark lines. These dark lines reduce the transmittance during the white display and darken the display. Providing greater spacings between the ribs can solve this problem, but this solution results in reduced number of alignment control structures. As a result, it takes longer time to stabilize the alignment after the prescribed voltage is applied to the liquid crystals, which slows down the response speed. A pre-tilt angle imparting technique using a polymer (hereinafter, also referred to as PSA (Polymer Sustained Alignment: alignment sustaining)) has been suggested to improve such a problem and achieve high luminance and high-speed response (see, for example, Patent Literatures 1 to 5).

In the PSA technique, a liquid crystal composition prepared by mixing liquid crystals with polymerizable components such as monomers and oligomers is filled in a space between substrates, the polymerizable components such as the monomers are polymerized into a polymer while a voltage is applied between the substrates to tilt liquid crystal molecules. A layer formed of such a polymer (hereinafter, also referred to as a PSA layer) allows to provide the prescribed pre-tilt angles to the liquid crystals even after elimination of applied voltage, and thus the alignment direction of the liquid crystals can be defined. The polymerizable components such as the monomers are polymerized by heating or light (ultraviolet rays) irradiation. A PSA technique eliminates a need for formation of ribs to improve the aperture ratio, and provides a pre-tilt angle of smaller than 90° to an entire display region to achieve fast response.

Polymer dispersed liquid crystal (PDLC) LCDs, which have a light control layer in which liquid crystals have been dispersed in a polymer matrix, perform display by scattering external light such as natural light or room light. The light control layer is prepared by light irradiation of a material for a light control layer including a liquid crystal composition, a radically polymerizable compound, and a photopolymerization initiator thereby polymerizing the radically polymerizable compound. Formation of a polymer matrix in a light control layer for dispersing liquid crystals in the matrix provides white display under no applied voltage because the refractive indexes of the polymer matrix and the liquid crystals are not agree with each other, and provides black display under applied voltage because the refractive indexes are agree with each other. The polymer matrix is a structure formed to surround liquid crystals, and is inherently different from the PSA layer formed on the substrate as a thin layer (see, for example, Patent Literatures 6 and 7).

CITATION LIST

Patent Literature

Patent Literature 1: JP 4175826 B
Patent Literature 2: JP 2005-221617 A
Patent Literature 3: JP 2005-338613 A
Patent Literature 4: JP 2008-116931 A
Patent Literature 5: JP 2006-58755 A
Patent Literature 6: JP H9-255706 A
Patent Literature 7: JP 4547598 B

SUMMARY OF INVENTION

Technical Problem

Examination of a pre-tilt angle imparting technique using a PSA layer by the present inventors indicates that the technique has several problems relating to display unevenness observed in an image displayed on a completed LCD. Abnormal alignment of liquid crystals locally generated when liquid crystal molecules are tilted by applying a voltage during monomer polymerization, leads to a problem of generating display unevenness in an image displayed on a completed LCD. The degree of such display unevenness is different depending on a monomer to be used, and monomers soluble in a liquid crystal material are not all suitable for the formation of a PSA layer.

It has been reported that a PSA layer with alignment characteristics can be provided in such a way that a composition containing a monomer used for PSA layer formation is filled into a cell, and UV irradiation is performed for a long time while a voltage is applied to polymerize the monomer. However, such a case suffers from a problem of a decrease in productivity (throughput) due to an increase in treatment time, deterioration of the structures in a panel due to long-time irradiation of light including UV light of not more than 310 nm, and generation of image sticking due to impurities accompanied by such deterioration of the structures.

Further, it has been reported that although throughput can be improved by adding a polymerization initiator for reducing polymerization time, performance of display is impaired, for example, display unevenness is generated. Both improved throughput and a favorable display quality are difficult to be achieved only by adding a polymerization initiator. Therefore, in the development aimed at achieving both high quality display and improved throughput, attention is attracted to a method of forming a PSA layer involving photopolymerization without adding a conventional photopolymerization initiator, but such a method with unclear polymerization initiation mechanism suffers from a problem of a decrease in throughput.

An aspect of the present invention has been made in view of the current state of the prior art described above, and aims to provide a liquid crystal display device produced by the use of a liquid crystal composition for PSA layer formation capable of providing both improved throughput and a favorable display quality, and a method for manufacturing a liquid crystal display device.

Solution to Problem

The present inventors have conducted various investigations on the cause of image sticking generated on a liquid crystal display when a conventional PSA technique is used, and have found the following problem. Use of a polymerization initiator self cleaving by light irradiation generates impurities which are easily electrically charged, by its self cleavage, and the impurities are left in a liquid crystal layer. Therefore, a DC offset voltage is generated in a cell (hereinafter, such a voltage generated in this way is also referred to as a residual DC voltage). As a result, even if a voltage is applied, an alignment state of liquid crystals is changed to generate image sticking.

The present inventors have further found that short-time UV irradiation leads to incomplete PSA layer formation, and a change in tilt angle of liquid crystal molecules increases due to energization of the liquid crystal display device, thereby causing image sticking. Herein, the term "change in the tilt angle" means the occurrence of a difference between the pre-tilt angles of liquid crystal molecules before and after applying voltage. An amount of change in tilt angle means a difference between the pre-tilt angles of liquid crystal molecules before and after applying voltage.

Specifically, the present inventors have found the following new method for improving throughput while maintaining a favorable display quality, involving the use of two or more kinds of radically polymerizable monomers, at least one of the monomers being a self-cleavage photopolymerization initiator to which a polymerizable group is bonded. Specifically, a radical can be efficiently generated in a liquid crystal layer through self-cleavage by light irradiation of the radically polymerizable monomers added to the liquid crystal material as a material for PSA layer formation. As a result, the UV irradiation time required to form the PSA layer can be significantly reduced to suppress the degradation of the structures in a panel. The present inventors have also found that a component derived from a polymerization initiator generated by self cleavage, which has a polymerizable group, is incorporated into the PSA layer by polymerization, and a polymerization initiator component can be effectively phase separated from the liquid crystal layer. In addition, promotion of the formation of the PSA layer suppresses the entry of impurities generated due to the degradation of the structures in a panel into the liquid crystals, thereby preventing an increase in a residual DC voltage.

The self-cleavage photopolymerization initiator to which a polymerizable group is bonded preferably has a structure capable of generating a radical by irradiation with light having a wavelength component of 350 nm or longer. The structure capable of generating a radical through self-cleavage reaction upon light irradiation preferably generates a radical by irradiation with light having a wavelength component of shorter than 400 nm. Irradiation with light having a wavelength component of shorter than 350 nm may deteriorate structures in a panel to impair the display performance. Thus, a self-cleavage photopolymerization initiator to which a polymerizable group is bonded preferably includes a structure capable of generating a radical through self-cleavage reaction that is efficiently caused by irradiation with light having a wavelength component of 350 nm or longer. Meanwhile, if absorption of light having a wavelength of 400 nm or longer, which is light emitted from a backlight (cold cathode fluorescent tube or LED) for a display, is observed in common use, an uncleaved photopolymerization initiator which is phase separated by polymerization may react during operation of the display, which may reduce long-term reliability. Accordingly, the above compound is preferably a photopolymerizable compound indicating no or sufficiently low absorption of light at 400 nm or longer. The present inventors have also found that a liquid crystal display device with long-term reliability can be manufactured by using a compound satisfying the above conditions, that is, by using, as a radically polymerizable monomer, a self-cleavage photopolymerization initiator represented by the formula (1) to which two polymerizable group are bonded.

The present inventors have also found that use of a compound represented by the formula (2) as one of the two or more kinds of radically polymerizable monomers allows easy formation of a polymer layer having alignment characteristics. In order to form a favorable alignment sustaining layer only by the compound represented by the formula (2), the compound needs to be subjected to long-time light irradiation. On the other hand, combination use of the compound represented by the formula (2) with the compound represented by the formula (1) allows formation of a PSA layer stably sustaining liquid crystals even by short-time light irradiation.

This method significantly improves the throughput when compared to a method not using a polymerization initiator, and provides a liquid crystal display device with a favorable display quality. As a result, the present inventors admirably solved the above-described problems, leading to completion of the present invention.

That is, one aspect of the present invention is a liquid crystal display device including:
a pair of substrates;

a liquid crystal layer placed between the pair of substrates, the liquid crystal layer containing a liquid crystal material; and a polymer layer formed on at least one of the pair of substrates, the polymer layer being configured to control the alignment of liquid crystal molecules, the polymer layer being formed by polymerization of two or more kinds of radical polymerizable monomers in the liquid crystal layer, at least one kind of the radical polymerizable monomers being a compound having a structure capable of generating a radical through self-cleavage reaction upon light irradiation and having two radically polymerizable groups, the structure being represented by the formula (1):

(1)

wherein $P^1$ and $P^2$ are the same as or different from each other, and each represent a radically polymerizable group, $Sp^1$ represents C1-C6 linear, branched, or cyclic alkylene, alkyleneoxy, or alkylenecarbonyloxy, $Sp^2$ represents C1-C6 linear, branched, or cyclic alkylene, alkyleneoxy, or alkylenecarbonyloxy, $L^1$ represents —F, —OH, or C1-C12 alkyl, alkenyl, or aralkyl, the alkyl and the alkenyl may be linear or branched, and when $n^1$ is not less than 2, $L^1$s are the same as or different from one another, when two $L^1$s are bonded to respective two adjacent carbon atoms in an aromatic ring, the two $L^1$s may be bonded to each other to form a ring structure, and the two $L^1$s are the same as or different from each other and each represent C1-C12 linear or branched alkylene or alkenylene, $L^2$ represents —F, —OH, or C1-C12 alkyl, alkenyl, or aralkyl, the alkyl and the alkenyl may be linear or branched, and when $n^2$ is not less than 2, $L^2$s are the same as or different from one another, when two $L^2$s are bonded to respective two adjacent carbon atoms in an aromatic ring, the two $L^2$s may be bonded to each other to form a ring structure, and the two $L^2$s are the same as or different from each other and each represent C1-C12 linear or branched alkylene or alkenylene, one or more hydrogen atoms of the alkyl, alkenyl, alkylene, alkenylene, or aralkyl represented by one of $L^1$ and $L^2$ may be replaced by —F or —OH, a —CH$_2$— group of the alkyl, alkenyl, alkylene, alkenylene, or aralkyl represented by one of $L^1$ and $L^2$ may be replaced by —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, or —OCO—CH=CH—, provided that an oxygen atom, a sulfur atom, and a nitrogen atom are not adjacent to one another, $n^1$ is an integer of 0 to 5, and $n^2$ is an integer of 0 to 5; and at least one kind of the other radical polymerizable monomers is a compound having a ring structure being represented by the formula (2), and having a monofunctional or polyfunctional polymerizable group:

(2)

wherein $R^1$ is —$R^2$-$Sp^3$-$P^3$, a hydrogen atom, a halogen atom, —CN, —NO$_2$, —NCO, —NCS, —OCN, —SCN, —SF$_5$, or C1-C18 linear or branched alkyl, $P^3$s are the same as or different from each other, and each represent a radically polymerizable group, $Sp^3$ represents C1-C6 linear, branched, or cyclic alkylene or alkyleneoxy, or a direct bond, a hydrogen atom of $R^I$ may be replaced by a fluorine or chlorine atom, a —CH$_2$— group of $R^I$ may be replaced by —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, or —OCO—CH=CH—, provided that an oxygen atom and a sulfur atom are not adjacent to each other, $R^2$ represents —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, —CO—CH=CH—, or a direct bond, $A^1$ and $A^2$ are the same as or different from each other, and each represent 1,2-phenylene, 1,3-phenylene, 1,4-phenylene, naphthalene-1,4-diyl, naphthalene-1,5-diyl, naphthalene-2,6-diyl, 1,4-cyclohexylene, 1,4-cyclohexenylene, 1,4-bicyclo[2.2.2]octylene, piperidine-1,4-diyl, decahydronaphthalene-2,6-diyl, 1,2,3,4-tetrahydronaphthalene-2,6-diyl, indan-1,3-diyl, indan-1,5-diyl, indan-2,5-diyl, phenanthrene-1,6-diyl, phenanthrene-1,8-diyl, phenanthrene-2,7-diyl, or phenanthrene-3,6-diyl, —CH$_2$— groups of $A^1$ and $A^2$ may be replaced by —O— or —S—, provided that the —O— and —S— are not adjacent to each other, a hydrogen atom of each of $A^1$ and $A^2$ may be replaced by a fluorine atom, a chlorine atom, —CN, or C1-C6 alkyl, alkoxy, alkylcarbonyl, alkoxycarbonyl, or alkylcarbonyloxy, Z represents —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, —OCO—CH=CH—, or a direct bond, and $n^3$ is 0, 1, or 2.

The components of the liquid crystal display device of an aspect of the present invention are not especially limited by other components as long as it essentially includes such components.

The polymer layer is formed on at least one substrate of the pair of substrates of the liquid crystal display device by using, as a radically polymerizable monomer, a compound having a structure capable of generating a radical through self-cleavage reaction upon light irradiation and having two radically polymerizable groups. Whereby, short-time polymerization reaction can be carried out without adding a polymerization initiator and no impurities derived from the polymerization initiator generate. This can prevent a decrease in a voltage holding ratio (VHR) in the liquid crystal layer, reducing deterioration of display quality. In such a case, only short-time light irradiation is required, thereby preventing deterioration of components due to long-time light irradiation. As a result, a liquid crystal display device that is less likely to generate image sticking due to a residual DC voltage can be manufactured.

Examples of the radically polymerizable monomer include one having a structure in which a polymerizable group is bonded to a self-cleavage photopolymerization initiator capable of generating a radical through self-cleavage reaction upon light irradiation. Specifically, examples of the radically polymerizable monomer include one having a structure in which two functional groups each having a radically polymerizable group are bonded to the molecular skeleton of 2,2-dimethoxy-1,2-diphenylethane-1-one (trade name: IRGACURE651, produced by BASF), which is a self-cleavage photopolymerization initiator.

The two radically polymerizable groups ($P^1$ and $P^2$ groups) are bonded to an initiator component via respective spacers ($Sp^1$ and $Sp^2$ groups). The two radically polymerizable groups act as a cross-linking agent. Whereby, a PSA layer stably sustaining liquid crystals and having favorable alignment characteristics can be formed even by short-time light irradiation.

The compound having a structure capable of generating a radical through self-cleavage reaction upon light irradiation and having two radically polymerizable groups may preferably be a compound represented by the formula (3):

(3)

wherein $P^1$ and $P^2$ are the same as or different from each other, and each represent a radically polymerizable group, $Sp^1$ represents C1-C6 linear, branched, or cyclic alkylene, alkyleneoxy, or alkylenecarbonyloxy, and

$Sp^2$ represents C1-C6 linear, branched, or cyclic alkylene, alkyleneoxy, or alkylenecarbonyloxy.

Examples of $P^1$ and $P^2$ each include (meth)acryloyloxy, (meth)acryloyl amino, vinyl, or vinyloxy. (Meth)acryloyloxy herein means acryloyloxy or methacryloyloxy, and (meth)acryloyl amino group herein means acryloyl amino or methacryloyl amino.

Specific examples of the compound represented by the formula (1) include compounds represented by the formulas (4-1) to (4-5):

(4-1)

(4-2)

(4-3)

(4-4)

(4-5)

Specific examples of the compound represented by the formula (2) include compounds represented by the formulas (5-1) to (5-5):

(5-1)

(5-2)

(5-3)

(5-4)

(5-5)

wherein $P^3$s are the same as or different from each other, and each represent a radically polymerizable group.

Examples of $P^3$ include (meth)acryloyloxy, (meth)acryloyl amino, vinyl, and vinyloxy.

In the pair of substrates included in the liquid crystal display device of an aspect of the present invention, a plurality of pixel electrodes is formed on one substrate, for example. This enables individually controlling the alignment of liquid crystal molecules in each pixel. A plurality of different colored color filters is arranged on the other substrate so that the color filters overlap with respective pixel electrodes on the counter substrate. This enables individually controlling display color in each pixel.

A polymer layer configured to control the alignment of liquid crystal molecules is formed on at least one of the pair of substrates. The polymer layer is formed by polymerization of two or more kinds of radically polymerizable monomers in the liquid crystal layer. Forming the polymer layer can allow liquid crystal molecules adjacent to the polymer layer to have determined initial inclinations. For example, if the polymer layer is formed by polymerizing monomers in the state that liquid crystal molecules have pre-tilt angles, the polymer layer includes a structure allowing the liquid crystal molecules to have pre-tilt angles.

At least one of the pair of substrates includes, for example, the outermost surface configured with an alignment film. The alignment film may be or may not be subjected to alignment treatment. Even if the film is not subjected to alignment treatment, for example, a vertical alignment film allows liquid crystal molecules to be aligned vertically to the film surface, and a horizontal alignment film allows liquid crystal molecules to be aligned horizontally to the film surface. In addition, the polymer layer including the compounds represented by the formulas (1) and (2) may be formed on the alignment film in order to suppress accumulation of electric charge on the surface of the alignment film to reduce image sticking caused by a residual DC voltage.

An aspect of the present invention is also a method for favorably manufacturing the liquid crystal display device of an aspect of the present invention.

That is, another aspect of the present invention is a method for manufacturing a liquid crystal display device comprising:

filling a space between one pair of substrates with a liquid crystal composition containing a liquid crystal material and two or more kinds of radical polymerizable monomers; and forming a polymer layer which is configured to control the alignment of the liquid crystal molecules, on the substrates, by light irradiation of the liquid crystal composition to polymerize the radical polymerizable monomers, wherein at least one kind of the radical polymerizable monomers is a compound having a structure capable of generating a radical through self-cleavage reaction upon light irradiation and having two radically polymerizable groups, the structure being represented by the formula (1), and at least one kind of the other radical polymerizable monomers is a compound having a ring structure being represented by the formula (2), and having a monofunctional or polyfunctional polymerizable group.

The features of the compounds used in the method of an aspect of the present invention are the same as the features of the compounds used in the liquid crystal display device of an aspect of the present invention described above.

The method for manufacturing a liquid crystal display device of an aspect of the present invention is not particularly limited by other processes, so long as the method includes the aforementioned steps. For example, as one embodiment of the method for manufacturing a liquid crystal display device of an aspect of the present invention, the method may include the step of forming an alignment film on the outermost surface of at least one substrate of the pair of substrates before the step of forming the polymer layer.

The preferred embodiments of the method for manufacturing a liquid crystal display device of an aspect of the present invention are the same as the favorable embodiments of the liquid crystal display device of an aspect of the present invention, described above. That is, the favorable embodiments of the method for manufacturing a liquid crystal display device of an aspect of the present invention are mentioned as follows:

(a) an embodiment in which the structure capable of generating a radical through self-cleavage reaction upon light irradiation generates a radical by irradiation of light having a wavelength component of not shorter than 350 nm, (b) an embodiment in which the structure capable of generating a radical through self-cleavage reaction upon light irradiation generates a radical by irradiation of light having a wavelength component of shorter than 400 nm, (c) an embodiment in which the compound represented by the formula (1) is a compound represented by the formula (3), (d) an embodiment in which the compound represented by the formula (1) is any one of compounds represented by the formulas (4-1) to (4-5), (e) an embodiment in which the $P^1$ and the $P^2$ are each (meth)acryloyloxy, (meth)acryloyl amino, vinyl, or vinyloxy, (f) an embodiment in which the compound represented by the formula (2) is any one of compounds represented by the formulas (5-1) to (5-5), and (g) an embodiment in which the $P^3$ is (meth)acryloyloxy, (meth)acryloyl amino, vinyl, or vinyloxy.

Advantageous Effects of Invention

According to an aspect of the present invention, the throughput can be significantly improved, the voltage holding ratio (VHR) in a liquid crystal layer can be reduced, and the generation of image sticking due to an increase in residual DC voltage and change in tilt angle can be suppressed. Thus, a liquid crystal display device with a favorable display quality can be manufactured.

DESCRIPTION OF EMBODIMENTS

An aspect of the present invention is explained in more detail below with reference to embodiments, but not limited only thereto.

Embodiment 1

A liquid crystal display device of an aspect of the present invention and a liquid crystal display device produced by a method for manufacturing a liquid crystal display device of an aspect of the present invention are used specifically for display devices such as televisions, personal computers, mobile phones, monitors, and information displays to exert excellent display characteristics.

Figure 1:
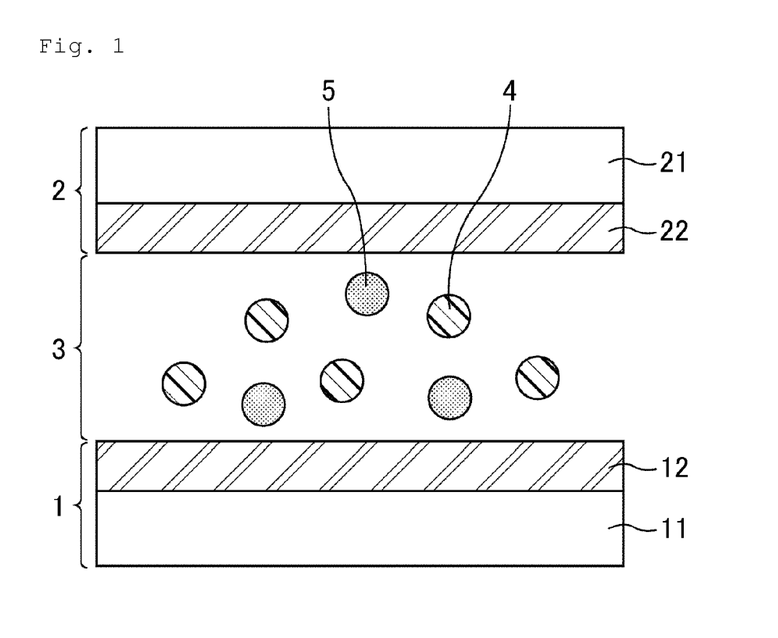
FIG. 1 is a schematic cross-sectional view of a liquid crystal cell manufactured by the method of an aspect of the present invention, before being subjected to PSA polymerization.
Figure 2:
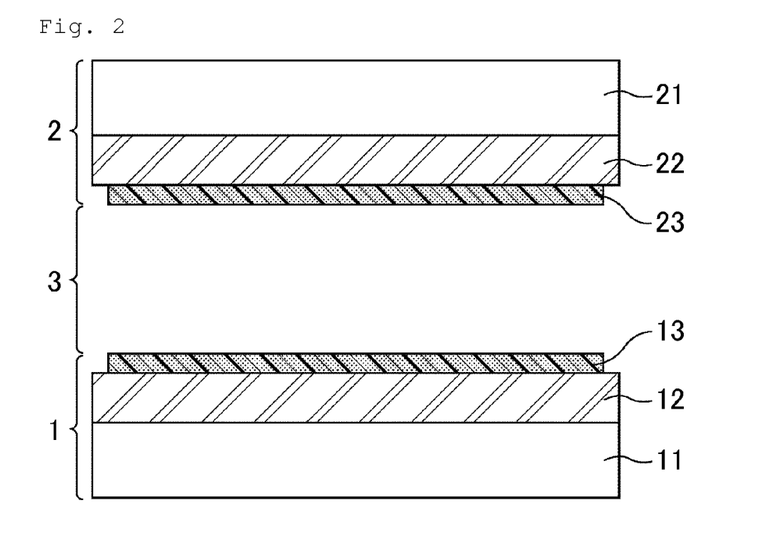
FIG. 2 is a schematic cross-sectional view of a liquid crystal cell manufactured by the method of an aspect of the present invention, after being subjected to PSA polymerization.

One example of the method for manufacturing a liquid crystal display device is described below. FIGS. 1 and 2 are each a schematic cross-sectional view of a liquid crystal cell in a manufacturing process, manufactured by the manufacturing method of an aspect of the present invention. FIG. 1 illustrates a liquid crystal cell before being subjected to PSA polymerization, and FIG. 2 illustrates a liquid crystal cell after being subjected to PSA polymerization. As illustrated in FIGS. 1 and 2, examples of the liquid crystal cell include one embodiment having first substrate 1, second substrate 2, and liquid crystal layer 3 placed between a pair of substrates including the first substrate 1 and the second substrate 2. The first substrate 1 includes array substrate 11 that includes an insulating transparent substrate including a substance such as glass, and includes on the transparent substrate, various wirings, a pixel electrode, TFTs (thin film transistors) or the like. The second substrate 2 includes color filter substrate 21 that includes an insulating transparent substrate including a substance such as glass, and includes on the transparent substrate, color filters, black matrix, and a common electrode.

The first substrate 1 includes alignment film 12 on the array substrate 11, and the second substrate 2 includes alignment film 22 on the color filter substrate 21. That is, the outermost surfaces of the first substrate 1 and the second substrate 2 are each made up of an alignment film. The alignment films 12 and 22 are formed of, for example, a polymeric material (polyimide) having an imide-containing main chain. The alignment films 12 and 22 with a surface subjected to alignment treatment allow setting a pre-tilt angle of liquid crystal molecules in an orthogonal or horizontal direction (liquid crystal molecules are allowed to be initially inclined).

A liquid crystal composition used in Embodiment 1 contains a liquid crystal material and two or more kinds of radically polymerizable monomers including radically polymerizable monomers 4 and 5. The liquid crystal material may have a positive or negative dielectric constant anisotropy. The radically polymerizable monomer 4 of the two or more kinds of radically polymerizable monomers has a structure capable of generating a radical through self-cleavage reaction upon light irradiation and has two radically polymerizable groups. The other radically polymerizable monomer, the monomer 5, is a compound having a ring structure and having a monofunctional or polyfunctional polymerizable group.

As illustrated in FIG. 1, the liquid crystal layer 3 before being subjected to PSA polymerization contains the two or more kinds of radically polymerizable monomers including the monomers 4 and 5. The radically polymerizable monomer 4 generates a radical through self-cleavage reaction upon light irradiation of the liquid crystal layer 3. The radical as active species initiates and successively continues chain polymerization of the radically polymerizable groups of the radically polymerizable monomers 4 and 5. The polymer prepared in such polymerization is deposited on the alignment films 12 and 22 as PSA layers 13 and 23, respectively, by phase separation, as illustrated in FIG. 2.

The radically polymerizable monomer 4 used in Embodiment 1 absorbs light and generates a radical by self-cleavage to initiate chain polymerization by itself, and thus no further polymerization initiator is required. This polymerization initiator, which includes two or more functional groups, functions as a monomer after self-cleavage, thereby greatly reducing the amount of the polymerization initiator left in the liquid crystal layer 3.

The radically polymerizable monomer capable of generating a radical through self-cleavage upon light irradiation as the radically polymerizable monomers used in Embodiment 1 may be a compound represented by the formula (1), and may specifically be a compound represented by the formula (3) or any one of compounds represented by the formulas (4-1) to (4-5).

The radically polymerizable monomer represented by the formula (1) has a structure capable of generating a radical by self-cleavage, and thus no further polymerization initiator is required when the monomer is mixed with a liquid crystal material, and polymerization reaction can be efficiently started only by light irradiation. Even if the radically polymerizable monomer does not react as a polymerization initiator, the polymerizable group bonded to the monomer reacts and the monomer is incorporated into the PSA layer. Accordingly, image sticking is less likely to generate when compared to the case where the PSA layer is formed using a polymerization initiator not containing a polymerizable group.

The other radically polymerizable monomer may be, for example, a compound represented by the formula (2), and specifically, may be any one of compounds represented by the formulas (5-1) to (5-5).

In Embodiment 1, if the liquid crystal layer 3 is irradiated with light under a threshold or higher voltage during a PSA polymerization step, for example, the PSA layer is formed to fit aligned liquid crystal molecules under a state with a threshold or higher voltage. As a result, the PSA layer has a structure defining the initial pre-tilt angle of the liquid crystal molecules even under no applied voltage. However, even if a voltage not less than the threshold value is not applied to the liquid crystal layer 3 during a PSA polymerization step, use of two or more kinds of radically polymerizable monomers of Embodiment 1 allows to prepare a PSA layer along the initial alignment.

Use of the two or more kinds of radically polymerizable monomers of Embodiment 1 provides a liquid crystal layer containing little polymerization initiator in a PSA polymerization step, thereby providing a liquid crystal display device that is less likely to generate a residual DC voltage and less likely to cause a change in tilt angle due to use of the display. The concentration of the two or more kinds of radically polymerizable monomers added to form a PSA layer is, for example, not more than 7% by mass for the total amount of the liquid crystal composition. The concentration is preferably not more than 3% by mass in view of the solubility of a monomer suitable for the PSA layer in the liquid crystals. The concentration of the two or more radically polymerizable monomers is determined based on the total amount of such monomers.

The concentration of the radically polymerizable compound used for the polymer dispersed liquid crystals (PDLC) disclosed in Patent Literature 7 is usually about 30 wt % (30 mol %) for the total amount of the liquid crystal composition.

Other components used in the liquid crystal display device according to Embodiment 1 will be described in detail.

In the liquid crystal display device according to Embodiment 1, the first substrate 1, the liquid crystal layer 3, and the second substrate 2 are stacked in the stated order from the back side to the viewing side of the liquid crystal display device. A polarizing plate is provided on the back side of the array substrate 11 provided with the first substrate 1. A polarizing plate is also provided on the viewing side of the color filter substrate 21 provided with the second substrate 2. Each polarizing plate may include a retarder. The polarizing plates may be circularly polarizing plates.

The liquid crystal display device according to Embodiment 1 may be of transmissive, reflective, or transflective type. Transmissive type and transflective type liquid crystal display devices according to Embodiment 1 further include a back light. The back light is arranged at the back side of the first substrate 1 such that light permeates through the first substrate 1, the liquid crystal layer 3, and the second substrate 2 in the stated order. In a reflective type or transflective type liquid crystal display device, the first substrate 1 includes a reflector to reflect external light. At least in the region using reflected light for display, the polarizing plate of the second substrate 2 needs to be a circularly polarizing plate including a retarder called $\lambda/4$ retarder.

The liquid crystal display device according to Embodiment 1 may include a color filter-on-array structure in which the first substrate 1 includes color filters. The liquid crystal display device according to Embodiment 1 may be a monochrome display device. In this case, no color filters are necessary.

The liquid crystal layer 3 is filled with a liquid crystal material containing liquid crystal molecules that are aligned in prescribed directions under a certain voltage. The alignment of the liquid crystal molecules in the liquid crystal layer 3 is controlled by the application of a threshold or higher voltage. In Embodiment 1, the alignment mode of the liquid crystal molecules is not particularly limited.

In the liquid crystal display device according to Embodiment 1, a liquid crystal display device (e.g. mobile phone, monitor, liquid crystal TV (television), information display) is decomposed and subjected to chemical analyses such as NMR (nuclear magnetic resonance), FT-IR (fourier transform infrared spectroscopy), and MS (mass spectrometry) analyses to analyze the monomer components for PSA layer formation in the PSA layer and to determine the amount of the monomer components for PSA layer formation in the liquid crystal layer, the proportions of the monomer components for PSA layer formation in the PSA layer and the like.

EXAMPLE 1

Liquid crystal cells were actually manufactured in Example 1 in accordance with Embodiment 1, which was described below. First, a pair of substrates was prepared. Then, a polyimide solution for a vertical alignment film was applied to each surface of the pair of substrates, pre-baked at 80° C. for 5 minutes, and subsequently post-baked at 200° C. for 60 minutes.

Then, a seal was applied to one of the substrates, a liquid crystal composition containing a liquid crystal material with a negative dielectric constant anisotropy and radically polymerizable monomers for PSA layer formation was added dropwise on the substrate, and the resulting substrate and the other substrate were attached together.

A radically polymerizable monomer used in Example 1 was selected from the radically polymerizable monomers represented by the formulas (6) to (8) in combination or alone. The compound represented by the formula (6) is a benzyl ketal bifunctional methacrylate monomer; the compound represented by the formula (7) is a benzyl ketal monofunctional methacrylate monomer; and the compound represented by the formula (8) is a phenanthrene bifunctional methacrylate monomer.

The liquid crystal cells were prepared as the following samples A to C in Example 1. In the sample A, 0.05 wt % of the compound represented by the formula (6) and 0.6 wt % of the compound represented by the formula (8) based on the total weight of the liquid crystal composition are contained. In the sample B, 0.05 wt % of the compound represented by the formula (7) and 0.6 wt % of the compound represented by the formula (8) based on the total weight of the liquid crystal composition are contained. In the sample C, 0.6 wt % of the compound represented by the formula (8) based on the total weight of the liquid crystal composition is contained.

Next, the liquid crystal layer between the pair of substrates was exposed to UV light having a peak wavelength between 300 to 370 nm for 30 minutes under no applied voltage to carry out polymerization reaction. A PSA layer was formed on a vertical alignment film through the polymerization reaction to complete liquid crystal cells. As a UV light source, FHF-32BLB produced by Toshiba Lighting & Technology Corporation was used. FHF-32BLB is a UV light source having low emission intensity at 310 nm and having high emission intensity at not shorter than 330 nm.

Subsequently, a voltage holding ratio (VHR), a residual DC voltage (rDC), and an amount of change in tilt angle were measured for each of the resulting liquid crystal cells. A VHR was measured using 6254 type VHR measuring device produced by TOYO TECHNICA INC. The measurement was performed in such a way that the voltage holding ratio for 16.61 ms was measured at a measurement temperature of 70° C. after 1 V of the pulse voltage was applied for 60 μS. An rDC was measured by a flicker elimination method at a measurement temperature of 40° C. after 2 V of the offset voltage was applied for 10 hours. The amount of change in tilt angle was measured by a crystal rotation method using a device produced by CHUO PRECISION INDUSTRIAL CO., LTD. in which after 10 V/60 Hz AC voltage was applied for 500 hours, the difference between the tilt angles before and after voltage application at a measurement temperature of 25° C.

Table 1 indicates the results of the measurements of the voltage holding ratio (VHR), the residual DC voltage (rDC), and the amount of change in tilt angle, of each liquid crystal cell in Example 1.

TABLE 1

| Sample | Weight ratio of radically polymerizable monomers | VHR (%) | rDC (mV) | Amount of change in tilt angle (°) |
|---|---|---|---|---|
| A | 0.05 wt % of compound represented by formula (6) + 0.6 wt % of compound represented by formula (8) | 99.5 | −10 | 0.03 |
| B | 0.05 wt % of compound represented by formula (7) + 0.6 wt % of compound represented by formula (8) | 99.4 | 130 | 0.09 |
| C | 0.6 wt % of compound represented by formula (8) | 99.5 | 40 | 0.13 |

Any of samples A, B, and C indicate high VHR values of not less than 99.4%. This is presumably because the PSA layer is formed in a short UV irradiation time of 30 minutes to reduce the generation of impurities due to deterioration of the structures (e.g. liquid crystals, alignment film) in the panel.

The sample B indicates a high rDC value of 130 mV. This is presumably because the compound represented by the formula (7) used in the sample B, which is monofunctional, is less likely to be incorporated in the PSA layer by polymerization, and is left in the liquid crystal layer as impurities. The sample A indicates a rDC value of −10 mV, which is significantly lower than the rDC values of the samples B and C. This is presumably because the compound represented by the formula (6) used for the sample A, which is bifunctional, is mostly incorporated in the PSA layer, and is not left in the liquid crystal layer.

The sample C indicates an amount of change in tilt angle of 0.130, which is the largest of the values of the samples. This is presumably because a polymerization initiator is not used in the sample C, which leads to incomplete formation of the PSA layer. Further, the sample A indicates an amount of change in tilt angle significantly smaller than those of the samples B and C. This is presumably because the compound represented by the formula (6) used in the sample A has two flexible polymerizable groups each of which is bonded to a spacer, thereby improving the crosslink density of the PSA layer and further stably sustaining the liquid crystals.

The above results indicate that combination use of a phenanthrene bifunctional methacrylate monomer represented by the formula (8) and a benzyl ketal bifunctional methacrylate monomer represented by the formula (6) reduces a UV irradiation time for PSA layer formation, whereby the VHR does not decrease and image sticking does not generate in the liquid crystal display device by an increase in the rDC or an increase in the amount of change in tilt angle.

EXAMPLE 2

Liquid crystal cells used for the liquid crystal display device in accordance with Embodiment 1 were actually manufactured in Example 2, which was described below. Samples of the liquid crystal cells used in Example 2 were prepared as in Example 1.

A radically polymerizable monomer used in Example 2 was selected from the radically polymerizable monomers represented by the formulas (6), (7), and (9) in combination or alone. The compound represented by the formula (9) is a biphenyl bifunctional methacrylate monomer.

(9)

The liquid crystal cells were prepared as the following samples D to F in Example 2. In the sample D, 0.05 wt % of the compound represented by the formula (6) and 0.3 wt % of the compound represented by the formula (9) based on the total weight of the liquid crystal composition are contained. In the sample E, 0.05 wt % of the compound represented by the formula (7) and 0.3 wt % of the compound represented by the formula (9) based on the total weight of the liquid crystal composition are contained. In the sample F, 0.3 wt % of the compound represented by the formula (9) based on the total weight of the liquid crystal composition is contained.

The liquid crystal cells were completed by forming a PSA layer on a vertical alignment film through polymerization reaction as in Example 1.

Subsequently, a voltage holding ratio (VHR), a residual DC voltage (rDC), and an amount of change in tilt angle were measured for each of the resulting liquid crystal cells. Measurements were performed as in Example 1.

Table 2 indicates the results of the measurements of a voltage holding ratio (VHR), a residual DC voltage (rDC), and a change in tilt angle of each of the liquid crystal cells in Example 2.

TABLE 2

| Sample | Weight ratio of radically polymerizable monomers | VHR (%) | rDC (mV) | Amount of change in tilt angle (°) |
|---|---|---|---|---|
| D | 0.05 wt % of compound represented by formula (6) + 0.3 wt % of compound represented by formula (9) | 99.3 | 20 | 0.03 |
| E | 0.05 wt % of compound represented by formula (7) + 0.3 wt % of compound represented by formula (9) | 99.3 | 110 | 0.11 |
| F | 0.3 wt % of compound represented by formula (9) | 98.9 | 150 | 0.13 |

The samples D and E both indicate high VHR values, but the sample F indicates a VHR value of less than 99%. This is presumably because, in the sample F, the polymerization rate of the monomer is slow, and impurities generated due to deterioration of the structures (e.g., liquid crystal, alignment film) in a panel flow into the liquid crystals before the PSA layer is formed. On the other hand, the sample D prepared by adding the compound represented by the formula (6) to the sample F has a high VHR value of 99.3%. This indicates that additional use of a benzyl ketal bifunctional methacrylate monomer represented by the formula (6) can maintain the VHR value high even if a monomer causing a decrease in VHR value when used alone is used.

The sample F indicates a high rDC value of 150 mV. This is presumably because no monomer capable of initiating polymerization is added, which leads to incomplete formation of the PSA layer. On the other hand, ionic impurities increase due to the deterioration of the liquid crystals and the alignment film. The sample E indicates a relatively high rDC value of 110 mV. This is presumably because the compound represented by the formula (7) contained in the sample E, which is monofunctional, is less likely to be incorporated in the PSA layer by polymerization, and is left in the liquid crystal layer as impurities. The sample D indicates a rDC value of 20 mV, which is significantly lower than the values of the samples E and F. This is presumably because the compound represented by the formula (6) contained in the sample D, which is bifunctional, is mostly incorporated in the PSA layer, and is not left in the liquid crystal layer.

The sample F indicates an amount of change in tilt angle of 0.13°, which is the largest of the values of the changes in tilt angle of the samples. This is presumably because the sample F does not contain a monomer capable of initiating polymerization, which leads to incomplete formation of the PSA layer. Further, the sample D indicates an amount of change in tilt angle significantly smaller than those of the samples E and F. This is presumably because the compound represented by the formula (6) contained in the sample D has flexible two polymerizable groups each of which is bonded to a spacer, thereby improving the crosslink density of the PSA layer and further stably sustaining the liquid crystals.

The above results indicate that combination use of a bifunctional biphenyl methacrylate monomer represented by the formula (9) and a benzyl ketal bifunctional methacrylate monomer represented by the formula (6) reduces a UV irradiation time for PSA layer formation, whereby the VHR does not decrease and image sticking does not generate in the liquid crystal display device by an increase in the rDC or an increase in the amount of change in tilt angle.

The difference between an aspect of the present invention and the invention in Patent Literature 7 is described below. As indicated in Patent Literature 7, a monofunctional radically polymerizable monomer is used as a polymerization initiator for a PDLC liquid crystal display device. On the other hand, the results of the above studies indicate that, in a liquid crystal display device using a PSA technique, a monomer having two radically polymerizable groups need to be used as a polymerization initiator for providing both improved throughput and a favorable display quality. Further, in a PDLC liquid crystal display device, display is performed using the difference between the refractive index of a polymer matrix constructed by polymerization of a radically polymerizable compound or the like and the refractive index of the liquid crystal molecules dispersed in the polymer matrix. The generation of the residual DC voltage or the change in tilt angle does not originally greatly affect the display quality of the liquid crystal display device.

REFERENCE SIGNS LIST

1: First substrate
2: Second substrate
3: Liquid crystal layer
4: Radically polymerizable monomer (a compound having a structure capable of generating a radical through self-cleavage reaction upon light irradiation and having two radically polymerizable groups)
5: Radically polymerizable monomer (a compound having a ring structure and having a monofunctional or polyfunctional polymerizable group)
11: Array substrate
12, 22: Alignment film
13, 23: PSA layer (polymer layer)
21: Color filter substrate

The invention claimed is:
1. A liquid crystal display device comprising:
a substrate;
a liquid crystal layer containing a liquid crystal material; and
a first layer formed on the substrate, the first layer being configured to control the alignment of liquid crystal molecules, the first layer being placed between the substrate and the liquid crystal layer, and being formed by polymerization of two or more kinds of radical polymerizable monomers in the liquid crystal layer,
at least one kind of the radical polymerizable monomers being a compound having a structure capable of generating a radical through self-cleavage reaction upon light irradiation and having two radically polymerizable groups, the structure being represented by the formula (1):

(1)

wherein $P^1$ and $P^2$ are the same as or different from each other, and each represent a radically polymerizable group,
$Sp^1$ represents C1-C6 linear, branched, or cyclic alkylene, alkyleneoxy, or alkylenecarbonyloxy, $Sp^2$ represents C1-C6 linear, branched, or cyclic alkylene, alkyleneoxy, or alkylenecarbonyloxy,
$L^1$ represents —F, —OH, or C1-C12 alkyl, alkenyl, or aralkyl, the alkyl and the alkenyl may be linear or branched, and when $n^1$ is not less than 2, $L^1$s are the same as or different from one another,
when two $L^1$s are bonded to respective two adjacent carbon atoms in an aromatic ring, the two Lis may be bonded to each other to form a ring structure, and the two $L^1$s are the same as or different from each other and each represent C1-C12 linear or branched alkylene or alkenylene,
$L^2$ represents —F, —OH, or C1-C12 alkyl, alkenyl, or aralkyl, the alkyl and the alkenyl may be linear or branched, and when $n^2$ is not less than 2, $L^2$s are the same as or different from one another,
when two $L^2$s are bonded to respective two adjacent carbon atoms in an aromatic ring, the two $L^2$s may be bonded to each other to form a ring structure, and the two $L^2$s are the same as or different from each other and each represent C1-C12 linear or branched alkylene or alkenylene,
one or more hydrogen atoms of the alkyl, alkenyl, alkylene, alkenylene, or aralkyl represented by one of $L^1$ and $L^2$ may be replaced by —F or —OH,
a —CH$_2$— group of the alkyl, alkenyl, alkylene, alkenylene, or aralkyl represented by one of $L^1$ and $L^2$ may be replaced by —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH—, provided that an oxygen atom, a sulfur atom, and a nitrogen atom are not adjacent to one another,
$n^1$ is an integer of 0 to 5, and
$n^2$ is an integer of 0 to 5; and
at least one kind of the other radical polymerizable monomers being a compound having a ring structure being represented by the formula (5-1) or (5-3):

(5-1)

(5-3)

wherein
$P^3$s are the same as or different from each other, and each represent a radically polymerizable group.
2. The liquid crystal display device according to claim 1, wherein the compound having a structure capable of generating a radical through self-cleavage reaction upon light irradiation and having two radically polymerizable groups is a compound represented by the formula (3):

(3)

where P¹ and P² are the same as or different from each other, and each represent a radically polymerizable group, Sp¹ represents C1-C6 linear, branched, or cyclic alkylene, alkyleneoxy, or alkylenecarbonyloxy, and Sp² represents C1-C6 linear, branched, or cyclic alkylene, alkyleneoxy, or alkylenecarbonyloxy.

3. The liquid crystal display device according to claim 1, wherein the P¹ and the P² each represent (meth)acryloyloxy, (meth)acryloyl amino, vinyl, or vinyloxy.

4. The liquid crystal display device according to claim 1, wherein the P³ represents (meth)acryloyloxy, (meth)acryloyl amino, vinyl, or vinyloxy.

5. The liquid crystal display device according to claim 1, wherein the substrate includes an outermost surface which faces the first layer, configured with a second layer.

6. The liquid crystal display device according to claim 1, wherein the compound having the structure represented by the formula (1) is represented by the formula (4-1), (4-2), (4-3), (4-4), or (4-5):

(4-1)

(4-2)

(4-3)

(4-4)

(4-5)

7. A method for manufacturing a liquid crystal display device comprising:
disposing a liquid crystal composition containing a liquid crystal material and two or more kinds of radical polymerizable monomers on a substrate; and
forming a first layer which is configured to control the alignment of the liquid crystal molecules, on the substrate, by light irradiation of the liquid crystal composition to polymerize the radical polymerizable monomers, thus forming the liquid crystal display device,
wherein at least one kind of the radical polymerizable monomers is a compound having a structure capable of generating a radical through self-cleavage reaction upon light irradiation and having two radically polymerizable groups, the structure being represented by the formula (1):

(1)

where $P^1$ and $P^2$ are the same as or different from each other, and each represent a radically polymerizable group,
$Sp^1$ represents C1-C6 linear, branched, or cyclic alkylene, alkyleneoxy, or alkylenecarbonyloxy,
$Sp^2$ represents C1-C6 linear, branched, or cyclic alkylene, alkyleneoxy, or alkylenecarbonyloxy,
$L^1$ represents —F, —OH, or C1-C12 alkyl, alkenyl, or aralkyl, the alkyl and the alkenyl may be linear or branched, and when $n^1$ is not less than 2, $L^1$s are the same as or different from one another,
when two $L^1$s are bonded to respective two adjacent carbon atoms in an aromatic ring, the two $L^1$s may be bonded to each other to form a ring structure, and the two $L^1$s are the same as or different from each other and each represent C1-C12 linear or branched alkylene or alkenylene,
$L^2$ represents —F, —OH, or C1-C12 alkyl, alkenyl, or aralkyl, the alkyl and the alkenyl may be linear or branched, and when $n^2$ is not less than 2, $L^2$s are the same as or different from one another,
when two $L^2$s are bonded to respective two adjacent carbon atoms in an aromatic ring, the two $L^2$s may be bonded to each other to form a ring structure, and the two $L^2$s are the same as or different from each other and each represent C1-C12 linear or branched alkylene or alkenylene,
one or more hydrogen atoms of the alkyl, alkenyl, alkylene, alkenylene, or aralkyl represented by one of $L^1$ and $L^2$ may be replaced by —F or —OH,
a —CH$_2$— group of the alkyl, alkenyl, alkylene, alkenylene, or aralkyl represented by one of $L^1$ and $L^2$ may be replaced by —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, or —OCO—CH=CH—, provided that an oxygen atom, a sulfur atom, and a nitrogen atom are not adjacent to one another,
$n^1$ is an integer of 0 to 5, and
$n^2$ is an integer of 0 to 5; and
at least one kind of the other radical polymerizable monomers is a compound having a ring structure being represented by the formula (5-1) or (5-3):

(5-1)

(5-3)

wherein
$P^3$s are the same as or different from each other, and each represent a radically polymerizable group.
8. The method according to claim 7,
wherein the compound having a structure capable of generating a radical through self-cleavage reaction upon light irradiation and having two radically polymerizable groups is a compound represented by the formula (3):

(3)

where $P^1$ and $P^2$ are the same as or different from each other, and each represent a radically polymerizable group, Sp¹ represents C1-C6 linear, branched, or cyclic alkylene, alkyleneoxy, or alkylenecarbonyloxy, and Sp² represents C1-C6 linear, branched, or cyclic alkylene, alkyleneoxy, or alkylenecarbonyloxy.

9. The method according to claim 7, wherein the P¹ and the P² each represent (meth)acryloyloxy, (meth)acryloyl amino, vinyl, or vinyloxy.

10. The method according to claim 7, wherein the P³ represents (meth)acryloyloxy, (meth)acryloyl amino, vinyl, or vinyloxy.

11. The method according to claim 7, wherein the substrate includes an outermost surface which faces the first layer, configured with a second layer.

12. The method according to claim 11, wherein the second layer is an alignment film.

13. The method according to claim 7, wherein the compound having the structure represented by the formula (1) is represented by the formula (4-1), (4-2), (4-3), (4-4), or (4-5):

(4-1)

(4-2)

(4-3)

(4-4)

(4-5)

\* \* \* \* \*